United States Patent
Horesh et al.

(10) Patent No.: US 11,531,676 B2
(45) Date of Patent: Dec. 20, 2022

(54) METHOD AND SYSTEM FOR ANOMALY DETECTION BASED ON STATISTICAL CLOSED-FORM ISOLATION FOREST ANALYSIS

(71) Applicant: INTUIT INC., Mountain View, CA (US)

(72) Inventors: Yair Horesh, Hod Hasharon (IL); Nir Keret, Even-Yehuda (IL); Yehezkel Shraga Resheff, Hod Hasharon (IL)

(73) Assignee: INTUIT INC., Mountain View, CA (US)

( * ) Notice: Subject to any disclaimer, the term of this patent is extended or adjusted under 35 U.S.C. 154(b) by 314 days.

(21) Appl. No.: 16/942,520

(22) Filed: Jul. 29, 2020

(65) Prior Publication Data
US 2022/0035806 A1 Feb. 3, 2022

(51) Int. Cl.
  *G06F 16/2458* (2019.01)
  *G06N 20/20* (2019.01)

(52) U.S. Cl.
  CPC ......... *G06F 16/2462* (2019.01); *G06N 20/20* (2019.01)

(58) Field of Classification Search
  CPC ..... G06F 16/2462; G06N 20/20; G06N 5/003
  See application file for complete search history.

(56) References Cited

U.S. PATENT DOCUMENTS

| | | | |
|---|---|---|---|
| 2018/0081913 A1* | 3/2018 | Suleiman | G06K 9/6256 |
| 2020/0349169 A1* | 11/2020 | Venkatesan | G06N 5/003 |
| 2021/0081170 A1* | 3/2021 | Agrawal | G06F 7/08 |
| 2021/0209486 A1* | 7/2021 | Fan | G06N 5/04 |

* cited by examiner

*Primary Examiner* — Michael Pham
(74) *Attorney, Agent, or Firm* — Patterson + Sheridan, LLP

(57) ABSTRACT

Certain embodiments of the present disclosure provide techniques for detecting anomalous activity in a computing system. The method generally includes receiving a request to perform an action in a computing system. The request is added to a historical time-series data set. A portion of the historical time-series data set is selected for use in determining whether the received request is an anomalous request, and a set of previously identified outliers are removed from the selected portion of the historical time-series data set. An anomaly score is calculated based on a statistical analysis of the received request and the selected portion of the historical time-series data set, wherein the anomaly score comprises a predicted number of operations executed to isolate the received request from the selected portion of the historical time-series data set. One or more actions are taken to process the received request based on the calculated anomaly score.

20 Claims, 10 Drawing Sheets

METHOD AND SYSTEM FOR ANOMALY DETECTION BASED ON STATISTICAL CLOSED-FORM ISOLATION FOREST ANALYSIS

INTRODUCTION

Embodiments of the present disclosure relate to anomaly detection in computing systems, and more specifically to detecting anomalies in computing systems using a statistical isolation forest analysis of events in a computing system to compare a current event to historical events in the computing system.

BACKGROUND

In computing systems, "normal" activity often follows a regular pattern. For example, in an access-controlled computing system, login attempts are generally performed from certain geographic areas and within a certain window of time. In a corporate computing environment, regular login attempts may generally be performed during working hours, and login attempts outside of working hours may represent potentially anomalous activity. Further, normal activity may correspond to login attempts received from areas in which employees are located, and potentially anomalous activity may correspond to login attempts received from areas in which employees are not located. Still further characteristics of access or login attempts in access-controlled computing systems that may remain consistent may include, for example, a number of login attempts submitted for a given user, the identity of a computing system from which a login attempt is received (as any user may attempt to access an access-controlled service from a limited universe of devices, such as the user's smartphone, tablet computer, work computer, and/or home computer), and the like. Because users of an access-controlled computing system generally perform various actions according to a regular pattern of activity, it may be assumed that future requests that have similar attributes as those of historical requests likely correspond to non-anomalous activity. Requests having attributes that are significantly different from those of historical requests may constitute potentially anomalous activity, and thus may be subject to further examination prior to allowing or disallowing processing of the request.

In another example, performance of different components in a computing system (e.g., physical components, virtualized components, services deployed in the computing system, etc.) may remain relatively consistent during regular operations. For example, different components in the computing systems may historically process requests within a relatively consistent amount of time, may exhibit a relatively consistent amount of latency in communications between the components in the computing system, and so on. Because components in a computing system exhibit similar performance characteristics during normal operations, logged performance characteristics that are similar to historical performance characteristics may indicate that a component is operating normally or otherwise as expected. However, performance characteristics that are significantly different from historical performance characteristics may indicate that a component is not operating normally or otherwise as expected, and thus, the component may be subject to further examination to determine whether the component is causing problems in the computing system.

Generally, anomaly detection may rely on large data sets of non-anomalous data in order to determine whether a new data point representing, for example, an incoming request to perform an action in an access-controlled computing system or current performance data for services or devices in a computing environment, corresponds to non-anomalous activity or potentially anomalous activity. Accordingly, techniques are needed to efficiently detect anomalies in computing systems.

BRIEF SUMMARY

Certain embodiments provide a computer-implemented method for detecting anomalous activity in a computing system. The method generally includes receiving a request to perform an action in a computing system. The request is added to a historical time-series data set. A portion of the historical time-series data set is selected for use in determining whether the received request is an anomalous request, and a set of previously identified outliers are removed from the selected portion of the historical time-series data set. An anomaly score is calculated based on a statistical analysis of the received request and the selected portion of the historical time-series data set, wherein the anomaly score comprises a predicted number of operations executed to isolate the received request from the selected portion of the historical time-series data set. One or more actions are taken to process the received request based on the calculated anomaly score.

Other embodiments provide a system comprising a processor and a non-transitory computer-readable memory storing instructions that, when executed by the processor, perform an operation for detecting anomalous activity in a computing system. The operation generally includes receiving a request to perform an action in a computing system. The request is added to a historical time-series data set. A portion of the historical time-series data set is selected for use in determining whether the received request is an anomalous request, and a set of previously identified outliers are removed from the selected portion of the historical time-series data set. An anomaly score is calculated based on a statistical analysis of the received request and the selected portion of the historical time-series data set, wherein the anomaly score comprises a predicted number of operations executed to isolate the received request from the selected portion of the historical time-series data set. One or more actions are taken to process the received request based on the calculated anomaly score.

Still further embodiments provide a system including a plurality of computing resources and a request gateway. The request gateway is configured to receive a request to perform an action on one or more of the plurality of computing resources. The request is added to a historical time-series data set. A portion of the historical time-series data set is selected for use in determining whether the received request is an anomalous request, and a set of previously identified outliers are removed from the selected portion of the historical time-series data set. An anomaly score is calculated based on a statistical analysis of the received request and the selected portion of the historical time-series data set, wherein the anomaly score comprises a predicted number of operations executed to isolate the received request from the selected portion of the historical time-series data set. One or more actions are taken to process the received request based on the calculated anomaly score.

The following description and the related drawings set forth in detail certain illustrative features of one or more embodiments.

BRIEF DESCRIPTION OF THE DRAWINGS

The appended figures depict certain embodiments of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
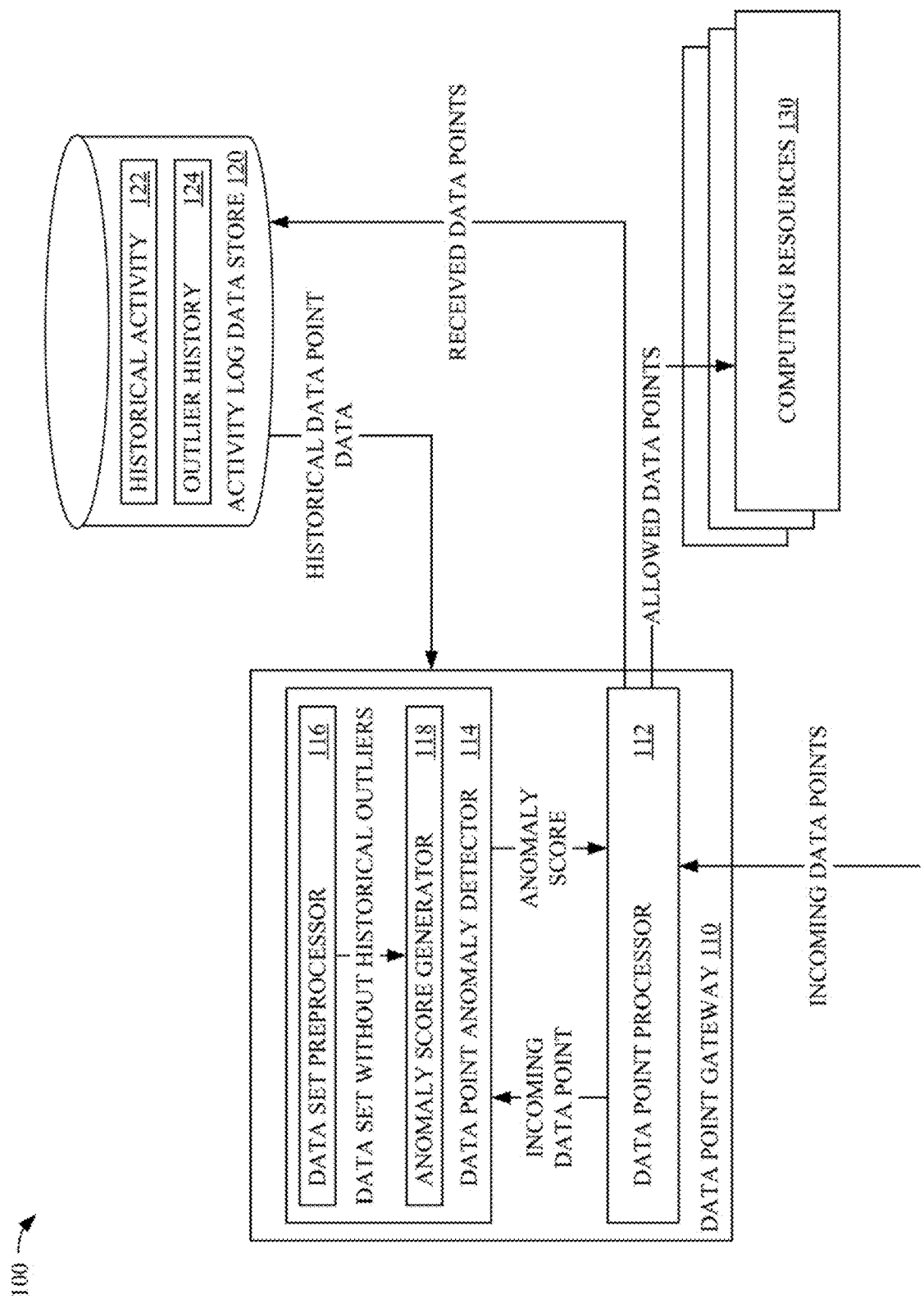
FIG. 1 depicts an example computing environment in which a statistical closed-form isolation forest analysis is used to identify anomalous requests to access computing resources in the computing environment.

Embodiments of the present disclosure provide apparatuses, methods, processing systems, and computer readable mediums for identifying anomalous activity in computing systems based on a statistical closed-form isolation forest analysis. Generally, non-anomalous activity may have similar attributes to activity that has previously been recorded in a computing system, and potentially anomalous activity may have attributes that are significantly different from activity that has previously been recorded in the computing system.

Anomaly detection generally allows for various attributes of computer systems to be monitored for the occurrence of anomalous activity that may be probative of security, performance, or other issues in a computing environment. Activity that is similar to previously recorded non-anomalous activity in the computing environment may be deemed non-anomalous because of the similarity to other non-anomalous activities in the computing environment. In such a case, a system may grant a user access to access-controlled resources, allow for the continued use of components (e.g., services) already deployed in a computing environment, and so on. Activity that is significantly different from previously recorded non-anomalous activity in the computing environment, however, may be deemed anomalous because of the size of the difference between the activity under examination and previously recorded activities in the computing environment. For example, a system may block access to access-controlled resources, initiate a rollback to a previous stable version of components deployed in the computing environment, identify the potential existence of hardware failures in the computing environment, and so on.

Because anomaly detection allows for various security and performance problems to be detected in a computing environment, techniques for detecting anomalies in the computing environment may be a powerful tool in maintaining the security and performance of services deployed in the computing environment. However, anomaly detection may be a computationally intensive process. To detect anomalies, generally, a model may be trained to recognize anomalies from regular activity within a computing environment, and the model may be deployed to the computing environment. As activity is recorded in the computing environment, the model may be used to infer whether the recorded activity is non-anomalous or potentially anomalous.

In some cases, anomaly detection may be performed using an isolation forest algorithm. In an isolation forest algorithm used for anomaly detection in a computing system, a model may be trained using a historical set of activity data within a computing system. Generally, training the model may be performed by building an isolation tree. To build the isolation tree, the historical activity data set may be recursively partitioned (i.e., divided using lines drawn through the data set) until each data point in the activity data set is isolated from other data points in the activity data set. The data set may be partitioned randomly through each iteration of a recursive function that partitions the data set. Based on the assumption that non-anomalous activity occurs frequently and anomalous activity occurs infrequently and has significantly different attributes from non-anomalous activity, an isolation forest model may determine that potentially anomalous activity (i.e., an outlier in a data set) requires a smaller number of partitions in order to be isolated than non-anomalous activity. Because a time-series data set in which activity in a computing system is analyzed may include a large number of data points, and because lines may be drawn randomly to partition the time-series data set, anomaly detection using isolation forests may be a time-intensive, unstable process.

Embodiments of the present disclosure use a statistical closed-form isolation forest analysis to determine whether activity in a computing system corresponds to non-anomalous or potentially anomalous activity. The statistical closed-form isolation forest analysis, as discussed in further detail below, may not involve training an isolation forest model and traversing the model to determine an anomaly score for a data point under analysis. Rather, instead of iterating through a data set and a tree structure to determine whether a data point under analysis is non-anomalous or potentially anomalous (e.g., an outlier, relative to non-anomalous data in the data set), the statistical closed-form isolation forest analysis may probabilistically predict (e.g., as a geometric distribution) a number of lines in a historical time-series data set that a typical isolation forest algorithm would draw in the historical time-series data set to isolate the data point under analysis from other data points in the historical time-series data set. By predicting the number of lines that an isolation forest algorithm would draw through a historical time-series data set to isolate a data point (representing, e.g., a request to access resources in an access-restricted computing environment or performance information for one or more services or devices in a computing environment), embodiments of the present disclosure may quickly and deterministically identify activity in the computing system as non-anomalous or potentially anomalous activity. Such a determination may allow for rapid remediation of anomalous activity in the computing environment (e.g., by blocking access to access-controlled resources, reverting to previous stable versions of a service deployed in a computing environment, migrating execution of services in the computing environment to other physical and/or virtual compute instances, and the like). Further, by predicting the number of lines that an isolation forest algorithm would draw through a historical time-series data set to isolate a data point, a model need not be trained or retrained, and a tree representing a trained model need not be traversed in order to determine whether a data point corresponds to non-anomalous or potentially anomalous activity within the computing system. Thus, techniques described herein may reduce the amount of computing resources (processing time, memory, etc.) needed to configure a computing system to detect anomalous activity within the computing system and to detect anomalous activity within the computing system.

Example Detection of Anomalous Access Requests in an Access-Controlled Computing System Based on a Closed-Form Isolation Forest Analysis FIG. 1 illustrates an example computing environment 100 in which an anomaly detection system uses a statistical closed-form isolation forest analysis to identify whether requests to access computing resources are anomalous or non-anomalous and process such requests based on whether the requests are determined to be anomalous or non-anomalous.

As illustrated, computing environment 100 includes a request gateway 110, activity log data store 120, and computing resources 130. Computing environment 100 may be an access-controlled computing environment in which requests to access one or more computing resources (e.g., to request the execution or performance of various actions within the computing environment 100 through the execution of one or more functions on computing resources 130). It should be recognized that the processing of requests in a computing environment may be performed on a single physical computing device (e.g., a server), a cluster of computing devices, a virtualized environment in which services are hosted by virtual machines executing on one or a cluster of computing devices, or any other computing environment in which requests to execute or perform functions may be received from external software applications or services.

Request gateway 110 generally is representative of an single point of entry at which computing environment 100 receives a request to invoke a function exposed by one of the plurality of services 130 from an external source (e.g., an external service interfacing with one or more computing resources 130 in computing environment 100, a software application executing on a client device, a web application executing on a remote server, etc.). As illustrated, request gateway 110 includes a request processor 112 and a request anomaly detector 114.

Request processor 112 generally receives incoming requests from external services and forwards the incoming requests to request anomaly detector 114 for analysis and the generation of an anomaly score indicative of whether the incoming requests correspond to non-anomalous activity or potentially anomalous activity. The incoming requests may include various attributes that can be used to determine whether the request corresponds to non-anomalous or potentially anomalous activity. These attributes may include, for example, a user identifier identifying the user attempting to access a computing resource 130 in computing environment 100, an internet protocol (IP) address identifying the computing device from which the request was received, a timestamp identifying when the request was generated, other contextual information about the request, and so on.

Request processor 112 generally receives an anomaly score from request anomaly detector 114, which, as discussed in further detail below, may represent a predicted number of lines needed to be drawn in a time-series data set in order to isolate properties of the incoming requests from data in a historical time-series data set. Generally, data points that are exactly the same as historical data points cannot be isolated using an isolation forest. Data points that are similar to historical data points may be isolated using a larger number of lines in a traditional isolation forest technique, while data points that are significantly different from historical data points may be isolated using a smaller number of lines in a traditional isolation forest technique. Thus, a larger number of lines needed to isolate an incoming request from other data points in the historical time-series data set may correspond to a higher likelihood that a request is a non-anomalous request. Likewise, a smaller number of lines needed to isolate an incoming request from other data points in the historical time-series data set may correspond to a higher likelihood that a request is potentially anomalous and warrants further examination.

Generally, request processor 112 uses the received anomaly score to identify one or more actions to perform in respect of a received request. If the received anomaly score indicates that the received request corresponds to non-anomalous activity (e.g., exceeds a threshold score, where larger scores indicate a higher likelihood that a request is non-anomalous, or falls below a threshold score, where smaller scores indicate a higher likelihood that a request is non-anomalous), request processor 112 can allow execution of the request and forward the request to the appropriate computing resource 130 for execution.

If, however, the received anomaly score indicates that the received request corresponds to potentially anomalous activity, request processor 112 can take one or more actions to control execution of the request.

For example, the request may be queued for execution, and the request processor 112 can execute one or more additional verification processes to determine whether to allow the request and forward the request to the appropriate computing resource 130 for execution. These additional verification processes may include, for example, initiating a multi-factor authentication process in which a verification code is sent to a user device, a challenge process requesting additional information that a user would be expected to know, or the like. If the additional verification processes are successfully completed (e.g., the user generating the request provides the appropriate verification code or other information), request processor 112 can forward the request to the appropriate computing resource 130 for execution. Otherwise, request processor 112 can block execution of the request.

In another example, request processor 112 can block execution of the request if the anomaly score indicates that the received request corresponds to potentially anomalous activity without requesting verification or confirmation from the user associated with the request.

Request processor 112 may commit the received requests to activity log data store 120 for use in determining whether future requests are anomalous or non-anomalous. Generally, request processor 112 may commit all received requests to historical activity 122. Requests that are determined to be anomalous may also be committed to outlier history 124, which may be used by request anomaly detector 114 to preprocess the data set prior to determining whether a request corresponds to non-anomalous or potentially anomalous activity, as discussed in further detail below.

In some embodiments, request processor 112 may featurize parameters in the received request prior to dispatching the received request to request anomaly detector 114 for processing. For example, request processor 112 can convert geographical source information from a textual value to one of a plurality of numerical values, where each numerical value corresponds to a unique geographical region. In another example request processor 112 may featurize an internet protocol (IP) address by treating the bitstream as a single value (e.g., a 32-bit integer for an IPv4 address, or a 128-bit long integer for an IPv6 address) rather than groups of smaller values. The featurized parameters may be used, as discussed in further detail below, in the historical time-series data set to determine an anomaly score for the received request.

Request anomaly detector 114 generally receives a request to perform an operation using one or more computing resources 130 from request processor 112 and generates an anomaly score for the request using a statistical closed-form isolation forest analysis of the received request against historical time-series data. As illustrated, request anomaly detector 114 includes a data set preprocessor 116 and an anomaly score generator 118.

Data set preprocessor 116 is generally configured to generate a data set to be used by anomaly score generator 118 to determine whether the received request corresponds to non-anomalous or potentially anomalous activity. The generated data set generally includes a data point corresponding to the received request as the last data point in the data set.

To generate the data set, data set preprocessor 116 may retrieve a subset of historical request data from historical activity 122 in activity log data store 120 and a subset of outlier history data from outlier history 124 in activity log data store 120. Generally, subset of data retrieved from historical activity 122 and outlier history 124 may correspond to data recorded during the same time period, which may be a rolling window over a set period of time (e.g., the last week or month of data ending at the time at which the request was received or generated). To generate the data set, data set preprocessor 116 can select the set difference of the subset of the historical request data and the subset of the outlier history data (i.e., remove previously identified outliers from the historical request data). Generally, by removing previously identified outliers from the historical request data, the data set generated by data set preprocessor 116 may be generated such that non-anomalous activity, but no potentially anomalous activity, is included in the set so that anomaly score generator 118 is unlikely to generate a false negative (i.e., mistakenly identify a potentially anomalous request as a non-anomalous request).

Anomaly score generator 118 uses the data set generated by data set preprocessor 116 to generate an anomaly score indicative of whether the received request corresponds to non-anomalous or potentially anomalous activity within computing system 100. To do so, anomaly score generator 118 may first compare the received request to the data set to determine whether an exact match to the received request exists in the data set. Generally, an exact match to the received request in the data set may indicate that the request has previously been seen and processed, and thus, that the request corresponds to non-anomalous activity in the computing system. Because the same request has previously been received and executed within computing system 100, anomaly score generator 118 can generate an anomaly score corresponding to a highest supported value for a data type used for the anomaly score, a reserved value, a programming language-specific special value, or the like. For example, if the anomaly score is generated as an unsigned 16-bit integer, the anomaly score for a request that is included in the data set generated by data set preprocessor 116 may be 65,535. In another example, the anomaly score may be set to a special value, such as the infinite value represented by math.inf in the Python language, to indicate that the request has previously been processed and determined to be non-anomalous.

Where the received request has a value that is the largest value in the data set, anomaly score generator 118 can determine the anomaly score for the received request based on the value of the received request and the value of the data point in the data set with the next largest value. For example, the anomaly score may be generated according to the equation:

$$anomalyScore = \frac{latestPoint}{latestPoint - u}$$

where latestPoint represents the value of the received request, and u represents the value of the data point in the data set with the next largest value.

Similarly, where the received request has a value that is the smallest value in the data set, anomaly score generator 118 can determine the anomaly score for the received request based on the value of the received request and the value of the data point in the data set with the next smallest value. For example, the anomaly score may be generated according to the equation:

$$anomalyScore = \frac{l}{l - latestPoint}$$

where latestPoint represents the value of the received request, and l represents the value of the data point in the data set with the next largest value.

If the received request does not match a previously processed request, does not correspond to the largest value in the data set, and does not correspond to the smallest value in the data set, anomaly score generator 118 can determine that the value of the request lies within the upper bound and the lower bound of the data set. To calculate an anomaly score for the received request, anomaly score generator 118 can identify the data points with the closest values to the value of the received request. The data points may include the closest data point with a value greater than the value of the received request and the closest data point with a value less than the received request. The anomaly score may be calculated as a geometric distribution based on the largest value in the data set, the closest data point with a value greater than the value of the received request, and the closest data point with a value less than the value of the received request.

The anomaly score may be calculated according to the equation:

$$anomalyScore = \frac{maxValue}{U-L} + \left(\frac{maxValue}{latestPoint-L} * \frac{U-latestPoint}{U-L}\right) + \left(\frac{maxValue}{U-latestPoint} * \frac{latestPoint-L}{U-L}\right)$$

where maxValue represents the largest value in the data set, latestPoint represents the value of the received request, U represents the value of the closest data point that is greater than the value of the received request (i.e., greater than latestPoint), and L represents the value of the closest data point that is less than the value of the received request (i.e., less than latestPoint).

$$\frac{maxValue}{U-L}$$

generally represents an expected number of lines that would be drawn (i.e., the number of partitions performed by an isolation forest algorithm) before a line is drawn in the data set between the value U of the closest data point that is greater than the value of the received request and the value L of the closest data point that is less than the value of the received data point. The calculation of the expected number of lines to be drawn in the data set before a line is drawn between U and L may not take into account the exact location of the line between U and L, as a traditional isolation forest algorithm is nondeterministic and may generate a line anywhere between U and L. Once a line has been drawn between U and L, further lines are drawn between U and L until the value of the received request (i.e., latestPoint) is isolated from the rest of the data set.

$$\left(\frac{maxValue}{latestPoint-L} * \frac{U-latestPoint}{U-L}\right)$$

generally represents the expected number of lines that are to be drawn by an isolation forest algorithm before a line is drawn in the data set between the value L of the closest data point that is less than latestPoint and latestPoint, multiplied by the probability that a line already exists between latestPoint and the value U of the closest data point that is greater than latestPoint. Likewise, $$\left(\frac{maxValue}{U-latestPoint} * \frac{latestPoint-L}{U-L}\right)$$

generally represents the expected number of lines that are to be drawn by an isolation forest algorithm before a line is drawn in the data set between the value U of the closest data point that is greater than latestPoint and latestPoint, multiplied by the probability that a line already exists between latestPoint and the value L of the closest data point that is less than latestPoint.

The anomaly score may thus be the expected number of lines that would be drawn by an isolation forest algorithm before the value of the received request is isolated from other data points in the data set. Generally, larger anomaly scores, which correspond to a larger number of lines that are expected to be drawn by an isolation forest algorithm to isolate the received request from other data points in the data set, may indicate that the received request corresponds to non-anomalous activity in computing environment 100. Similarly, smaller anomaly scores, which correspond to a smaller number of lines that are expected to be drawn by an isolation forest algorithm to isolate the received request from other data points in the data set, may indicate that the received request corresponds to potentially anomalous activity in computing environment 100 (e.g., an outlier relative to the activity represented by the data set generated by data set preprocessor 116). After calculating the anomaly score, anomaly score generator 118 can output the anomaly score to request processor 112, and request processor 112 can use the anomaly score to determine whether to allow or block the request to access computing resources 130, as discussed above.

Figure 2:
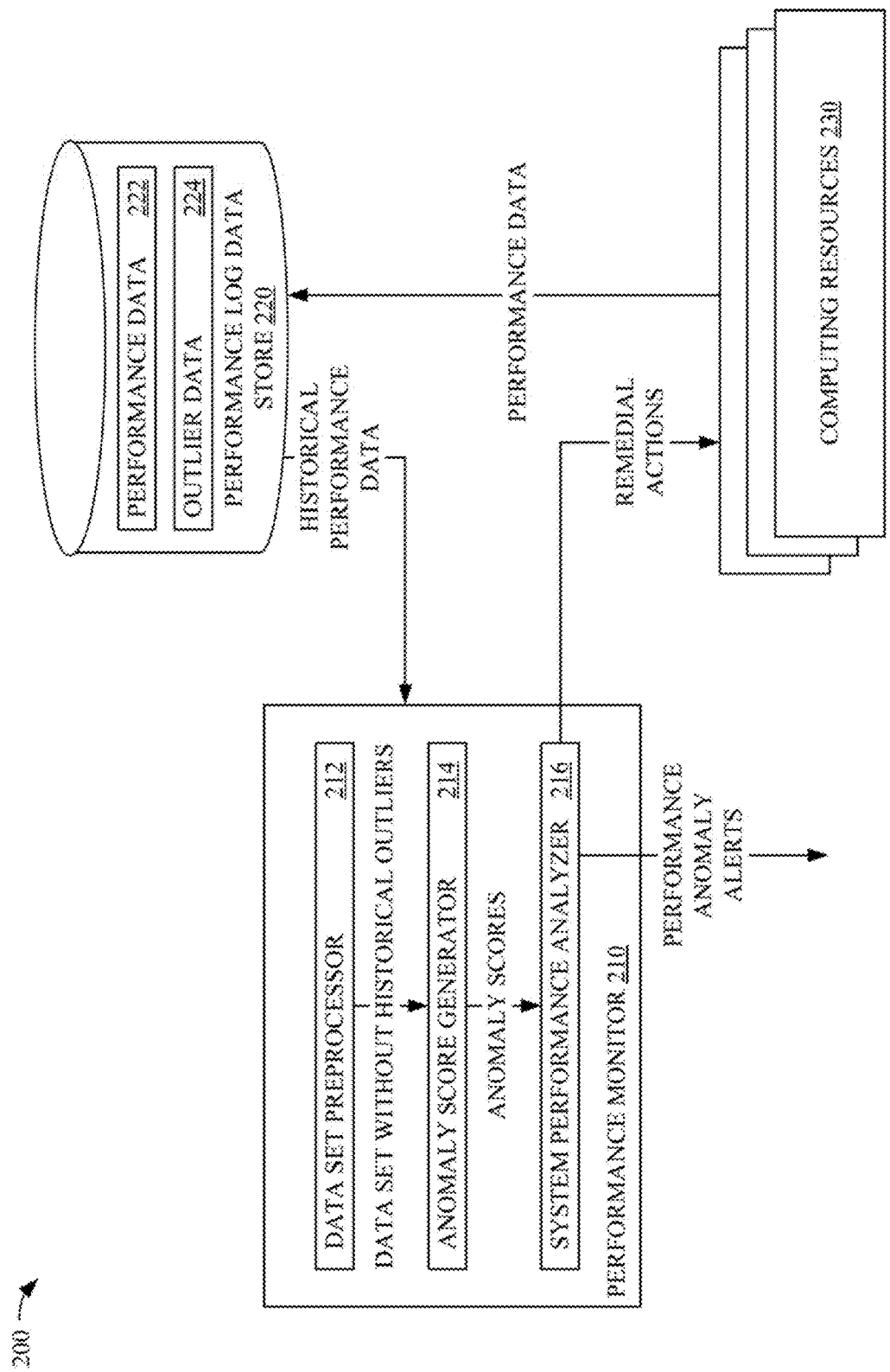
FIG. 2 depicts an example computing environment in which a statistical closed-form isolation forest analysis is used to identify performance anomalies for components in the computing environment.

Example Detection of Anomalous System Performance Based on a Closed-Form Isolation Forest Analysis FIG. 2 illustrates an example computing environment 200 in which a statistical closed-form isolation forest analysis is used to identify performance anomalies for components in the computing environment. As illustrated, computing environment 200 includes a performance monitor 210, performance log data store 220, and computing resources 230. It should be recognized that the computing environment 200 may be a single physical computing device (e.g., a server), a cluster of computing devices, a virtualized environment in which services are hosted by virtual machines executing on one or a cluster of computing devices, or any other computing environment in which requests to execute or perform functions may be received and processed.

Performance monitor 210 generally monitors the performance of computing resources 230 in computing environment 200 and takes one or more actions in response to detecting performance anomalies in the computing environment 200. As illustrated, performance monitor 210 includes a data set preprocessor 212, anomaly score generator 214, and system performance analyzer 216.

Generally, data set preprocessor 212 may generate a data set for use in analyzing system performance data and identifying whether a system is performing anomalously (e.g., is slow to respond to communications, in a spinlock situation, or is otherwise exhibiting performance degradation that may degrade the performance of the computing system 200 to internal and/or external users) as performance metrics are logged in performance log data store 220. To generate the data set, data set preprocessor 212 can retrieve a set of data from performance data 222 and a set of historical outliers from outlier data 224 in performance log data store 220. The set of data retrieved from performance data 222 and the set of historical outliers from outlier data 224 may include data within a sliding time window set to a time period prior to the most recent data point added to performance data 222. Data set preprocessor 212 can then generate a data set to be used in determining whether a computing resource 230 is experiencing anomalous performance by removing the outliers retrieved from outlier data 224 from the set of data retrieved from performance data 222. The outliers retrieved from outlier data 224 may be data points in performance data 222 previously identified as outliers, according to the techniques described herein.

After generating the data set, data set preprocessor 212 provides the generated data set to anomaly score generator 214. Anomaly score generator 214 generally generates an anomaly score based on a statistical analysis of the value of the latest recorded performance metric in the data set against historical performance metrics in the generated data set and outputs the anomaly score to system performance analyzer 216.

Similar to the anomaly detection techniques discussed above with respect to requests to access computing resources in an access-controlled computing system in FIG. 1, anomaly score generator 214 can first determine whether the value of the latest data point has previously been recorded in performance log data store within the time window encompassed by the generated data set. If the value of the latest data point has previously been recorded within the time window encompassed by the generated data set, anomaly score generator 214 can generate an anomaly score as a maximum value of the data type used to represent the anomaly score, a reserved value, or a language-specific special value (e.g., math.inf in the Python language). If anomaly score generator 214 determines that the value of the latest recorded performance metric is the largest value in the generated data set, anomaly score generator 214 can generate an anomaly score based on the value of the latest recorded performance metric and the value of the next highest performance metric in the generated data set. Similarly, if anomaly score generator 214 determines that the value of the latest recorded performance metric is the smallest value in the generated data set, anomaly score generator 214 can generate an anomaly score based on the value of the latest recorded performance metric and the value of the next lowest performance metric in the generated data set.

If the value of the latest recorded performance metric has not been previously recorded and is neither the largest nor the smallest value in the generated data set, anomaly score generator 214 can generate an anomaly score as a geometric distribution based on the value of the latest recorded performance metric, the value of the next higher performance metric in the generated data set, and the value of the next lower performance metric in the generated data set. This geometric distribution may allow for a probabilistic calculation of a number of lines that a traditional isolation forest algorithm would draw to isolate the current performance metric from other recorded performance metrics in the data set based on a probability that a line has already been drawn between the value of the current performance metric and the value of the next highest performance metric, as well as a probability that a line has already been drawn between the value of the current performance metric and the value of the next lowest performance metric. Because a geometric distribution allows for a probabilistic calculation, the use of a geometric distribution to calculate an anomaly score generally allows for an anomaly score to be calculated without training an isolation forest model or traversing a tree generated by training an isolation forest model to determine an anomaly score for the latest recorded performance metric. That is, the anomaly score may be calculated mathematically, according to the equations discussed above and may represent an expected number of lines that would be drawn by an isolation forest algorithm to isolate the value of the latest recorded performance metric from other data points in the generated data set, rather than iteratively, which may be a time-consuming and computationally expensive process.

System performance analyzer 216 generally receives anomaly scores from anomaly score generator and determines whether the anomaly score is indicative of a potential performance issue at one or more computing resources 230 in computing environment 200. Generally, system performance analyzer 216 may be configured with acceptable performance threshold scores for each computing resource 230 in computing environment 200, which may be a threshold correlated with a particular anomaly score and determined a priori from historical performance data.

If the anomaly score for a performance metric recorded for a computing resource 230 does not meet the acceptable performance threshold score for the computing resource 230, system performance analyzer 216 can determine that the performance of the computing resource 230 is outside of expected performance and can take one or more actions to remedy performance issues in the computing system. For example, system performance analyzer 216 can attempt to remedy performance issues in the computing system by rolling back a service to a previous version that is known to operate properly, migrating a service from one computing resource (e.g., a physical and/or virtual computing instance) to another computing instance, or taking other actions to prevent performance issues from adversely affecting the overall performance of computing environment 200. System performance analyzer 216 can also or alternatively generate alerts identifying the computing resource(s) 230 experiencing performance issues based on the anomaly scores generated for the computing resource(s) 230. These alerts may be transmitted to one or more external users to inform these users that a performance issue exists in computing environment 200 for investigation and resolution.

Figure 3A:
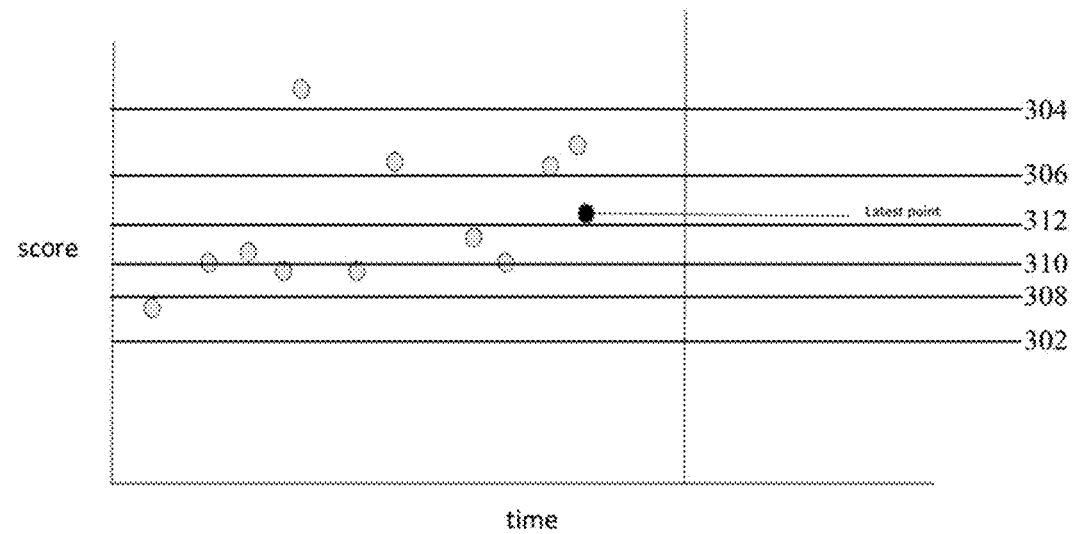
FIGS. 3A and 3B illustrate example isolation forest analyses of a data point relative to historical time-series data.
Figure 3B:
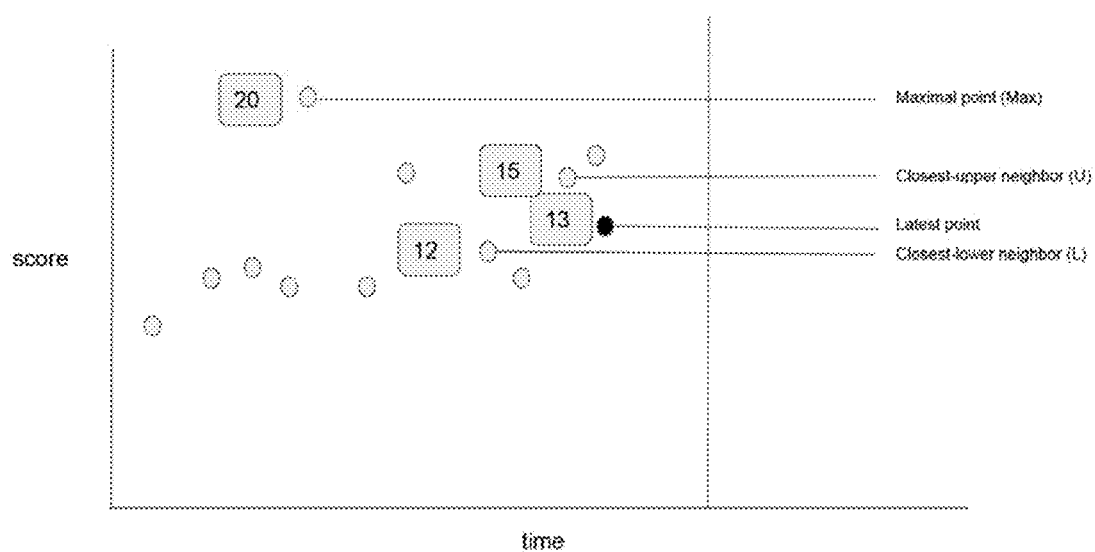

Example Anomaly Score Calculation Based on a Statistical Closed-Form Isolation Forest Analysis of a Data Point in a Time-Series Data Set FIGS. 3A and 3B illustrate an example isolation forest analyses 300A and 300B of a time-series data set.

FIG. 3A illustrates an isolation forest analysis 300A in which a data set is iteratively partitioned until the latest data point in a historical time-series data set is isolated from other data points in the data set. As illustrated, to isolate the latest point, a system can draw a first line 302 in the data set and determine whether the latest data point is above or below first line 302. Since the latest data point is above first line 302, the system can ignore any data points below first line 302 and draw a second line 304 at some location above first line 302. Since the latest data point is above first line 302 and below second line 306, but because multiple data points exist between first line 302 and second line 306, a third line 306 may be drawn between first line 302 and second line 306. This process may continue iteratively, as shown by fourth line 308, fifth line 310, and sixth line 312, until the latest point is isolated between two lines in the isolation forest analysis 300A (i.e., as illustrated, between third line 306 and sixth line 312).

FIG. 3B illustrates an isolation forest analysis 300B in which an anomaly score is generated for the latest data point in a historical time-series data set based on a statistical closed-form isolation forest analysis, according to embodiments discussed herein. As illustrated, the latest point has a value latestPoint of 13, the closest lowest neighbor point has a value L of 12, the closest upper neighbor has a value U of 15, and the maximal point has a value maxValue of 20.

To generate an anomaly score for the latest point in the time-series data set 300, an anomaly score generator first determines that the value of the latest point has not previously been recorded in the time-series data set, and thus determines that the anomaly score is not to be set to a reserved value indicating that the value of the latest point has previously been recorded in the historical time-series data set. The anomaly score generator also determines that the value of the latest point is not the highest value in the historical time-series data set or the lowest value in the historical time-series data set. Thus, the anomaly score generator can generate the anomaly score for the latest point according to the equation:

$$anomalyScore = \frac{maxValue}{U-L} + \left(\frac{maxValue}{latestPoint-L} * \frac{U-latestPoint}{U-L}\right) + \left(\frac{maxValue}{U-latestPoint} * \frac{latestPoint-L}{U-L}\right),$$

as discussed above.

As discussed, the anomaly score may be generated as the expected number of lines drawn in the time-series data set before a line is drawn between U and L, the expected number of lines drawn in the time-series data set before a line is drawn between L and latestPoint, the probability that a line already exists between latestPoint and U, the expected number of trials drawn in the time-series data set before a line is drawn between U and latestPoint, and the probability that a line already exists between latestPoint and L. The expected number of lines drawn in the time-series data set before a line is drawn between points U and L illustrated in FIG. 3B, represented by the equation $$\frac{maxValue}{U-L},$$

may result in the value of $$\frac{20}{15-12} = 6.67.$$

The expected number of lines drawn in the time-series data set before a line is drawn between L and latestPoint, represented by the equation $$\frac{maxValue}{latestPoint-L},$$

may result in the value of $$\frac{20}{13-12} = 20.$$

The probability that a line already exists between latestPoint and U, represented by the equation $$\frac{U-latestPoint}{U-L},$$

may result in the value of $$\frac{15-13}{15-12} = 0.67.$$

The expected number of lines drawn in the time-series data set $$\frac{maxValue}{U-latestPoint},$$

before a line is drawn between U and latestPoint, represented by the equation may result in the value of $$\frac{20}{15-13} = 10.$$

Finally, the probability that a line already exists between latestPoint and L, represented by the equation $$\frac{latestPoint-L}{U-L},$$

may result in the value of $$\frac{13-12}{15-12} = 0.33.$$

Thus, the anomaly score may be calculated as anomalyScore=6.67+(20*0.67)+(10*0.33)=23.37. The anomaly score of 23.37 indicates that for the data illustrated in time-series data set 300, roughly 23 lines would be needed to isolate the latest point from other data points in the data set. The anomaly score may be generated statistically, using the equations discussed above, rather than through the partitioning of the time-series data set 300 that would occur using typical isolation forest techniques. Thus, determination of whether a data point representing an incoming request or logged performance data for a computing resource in a computing system (among others) may be performed deterministically, and performance may be accelerated relative to partitioning the data set using an isolation forest algorithm until the data point is isolated. Further, the calculation of an anomaly score as a predicted number of lines drawn in a data set to isolate the latest point from other data in the historical data set may be performed without needing to train a model to generate an anomaly score or traversing a tree representing an isolation forest model to determine a number of line that are drawn in order to isolate the latest point, both of which may be computationally expensive and time-consuming processes. Thus, calculation of an anomaly score and determining whether a data point corresponds to non-anomalous or potentially anomalous data using the techniques described herein may allow for anomaly detection using fewer processing cycles, less processing time, and less memory than would be used by typical isolation forest techniques.

Figure 4:
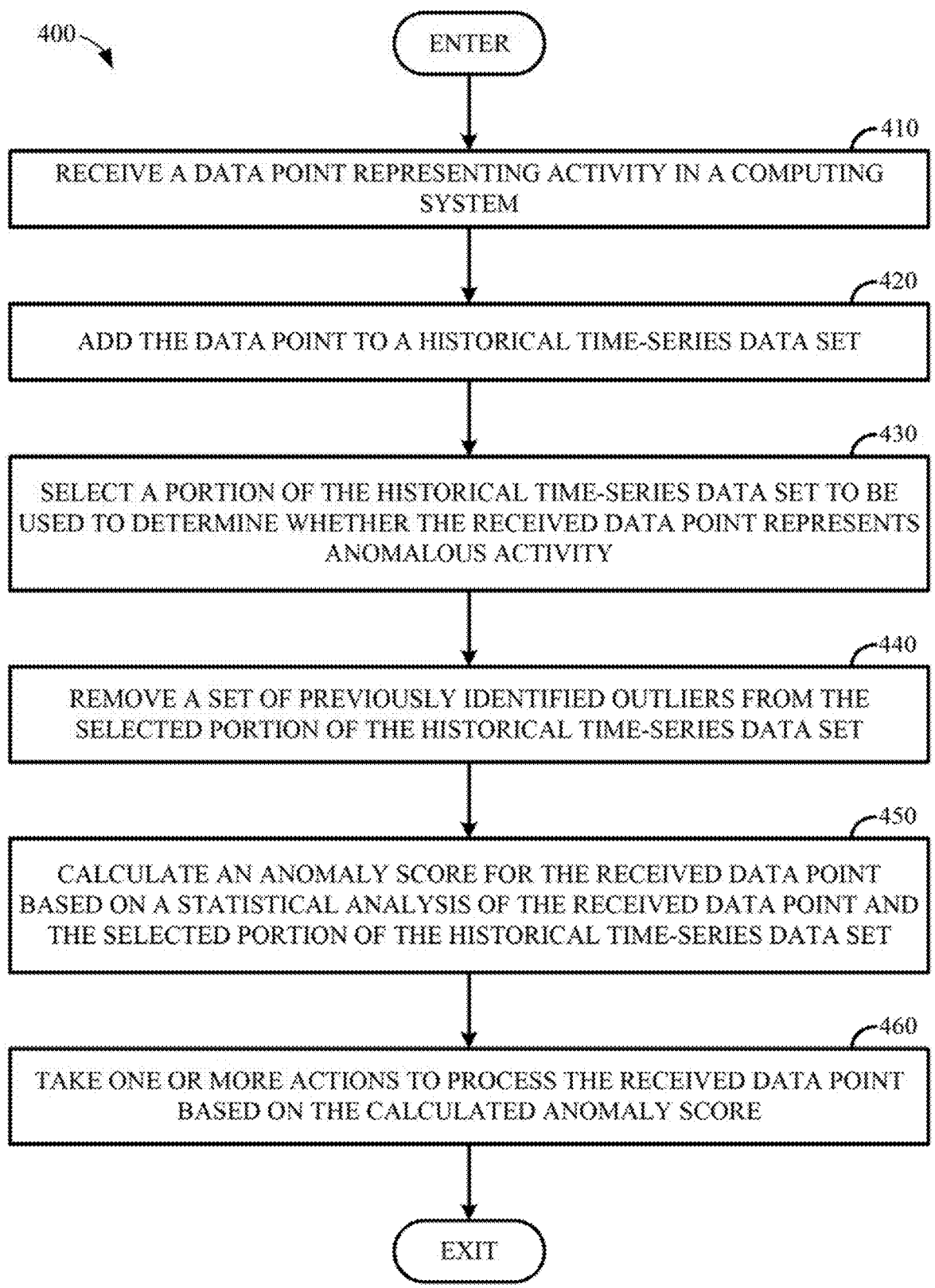
FIG. 4 illustrates example operations for identifying anomalous activity in a computing system based on anomaly scores generated using a statistical closed-form isolation forest analysis.

Example Identification of Anomalous Activity in a Computing System Using a Statistical Closed-Form Isolation Forest Analysis FIG. 4 illustrates example operations 400 for identifying anomalous activity in a computing system based on a statistical closed-form isolation forest analysis of activity against historical activity data. The operations described herein may be executed by one or more systems in an access-controlled computing environment (e.g., a request gateway 110 or an individual service executing on a computing resource 130 illustrated in FIG. 1), by a performance monitor in a computing environment (e.g., performance monitor 210 illustrated in FIG. 2), or the like.

As illustrated, operations 400 begin at block 410, where a system receives a data point representing activity in a computing system. The data point may represent various activity within the computing system, such as a request to access one or more resources in the computing system, performance data recorded for one or more resources in the computing system, and the like. The data point may include one or more attributes that can be used to determine whether the data point corresponds to non-anomalous or potentially anomalous activity within the computing system.

For example, where a data point represents a request to access resources in an access-controlled computing environment, the one or more attributes may include a timestamp, geographical information, a point of origin of the received request, or other information that can be used to determine whether an access request is potentially anomalous and thus should be rejected.

In another example, where a data point represents logged performance data for a resource in the computing system, the attributes may include numerical performance data, such as a determined latency (e.g., obtained through ICMP ping messages sent to the resource in the computing system), a response time, a processing time, or other performance information that can be used to determine whether the resource is exhibiting anomalous performance that may degrade the performance of the computing system. In some embodiments, the system can featurize the parameters included in the data point to convert the parameters in the data point to a numerical value that can be used to determine whether the activity in the computing system is potentially anomalous activity.

At block 420, the system adds the data point to a historical time-series data set.

At block 430, the system selects a portion of the historical time-series data set to be used to determine whether the received data point represents anomalous activity. Generally, the portion of the historical time-series data set may be selected based on an amount of time prior to a timestamp associated with the data point. For example, the system can select data from a week, month, year, or any other arbitrary amount of time prior to the timestamp associated with the data point. Generally, longer windows of time from which the portion of the historical time-series data set is selected may provide for an increased number of data points that can be used in determining whether the received data point represents anomalous activity.

At block 440, the system removes a set of previously identified outliers from the selected portion of the historical time-series data set. Generally, to remove the previously identified outliers from the selected portion of the historical time-series data set, the system can retrieve outlier data points from an outlier data store that were recorded over the same time window as the portion of the historical time-series data set selected for use in determining whether the received data point represents anomalous activity. By removing outlier data points, the system can reduce a likelihood that real outlier values representing potentially anomalous activity are falsely flagged as non-anomalous activity (e.g., can reduce a likelihood of generating false positives for a data point under examination).

At block 450, the system calculates an anomaly score for the received data point based on a statistical analysis of the received data point and the selected portion of the historical time-series data set. As discussed, the system can calculate the anomaly score by determining whether the received data point is an exact match to a previously received data point, whether the received data point is the largest data point in the selected portion of the historical time-series data set, or whether the received data point is the smallest data point in the selected portion of the historical time-series data set.

If the received data point is not an exact match to a previously received data point, is not the largest data point in the selected portion of the historical time-series data set, and is not the smallest data point in the selected portion of the historical time-series data set, the system can calculate the anomaly score as a geometric distribution based on data points adjacent to the received data point in the selected portion of the historical time-series data set.

At block 460, the system takes one or more actions to process the received data point based on the calculated anomaly score.

Generally, the system can determine whether the received data point corresponds to non-anomalous or potentially anomalous activity based on a comparison of the anomaly score to a threshold value, which may correspond to an expected number of lines that would be generated by an isolation forest algorithm in order to isolate the received data point in the selected portion of the historical time-series data set.

In some embodiments, larger numbers of lines expected to be drawn in the selected portion of the historical time-series data set (and thus, larger anomaly scores) may indicate a higher likelihood that the data point represents non-anomalous activity, while smaller numbers of lines may indicate a higher likelihood that the data point represents potentially anomalous activity. For activity that is likely to be non-anomalous activity, the system can allow an operation to be performed (e.g., in an access-controlled computing environment) or determine that no action need be performed to maintain the performance of systems in the computing environment. For activity that is potentially anomalous activity, the system can temporarily block execution of the operation pending further confirmation, block execution of the operation in the computing environment without requesting confirmation, or determine that one or more actions are to be performed to remediate performance issues within the computing environment.

In some embodiments, operations 400 may be used to determine whether access requests in an access-restricted computing system are potentially anomalous or non-anomalous based on the geographic point of origin from which a request is received. Suppose, for illustrative purposes, that users of an access-restricted computing system are located in San Diego County, Calif., with ZIP codes ranging from 91901 through 92199. Suppose, further, that an incoming request has a point of origin of ZIP code 92011, that this request has not been seen previously, and the closest neighbors to this request come from ZIP codes 92010 and 92014, respectively. Because the incoming request has neither been previously seen and is neither the largest nor smallest value in the data set, an anomaly score for this request may be calculated according to the equation:

$$anomalyScore = \frac{maxValue}{U - L} + \left(\frac{maxValue}{latestPoint - L} * \frac{U - latestPoint}{U - L}\right) + \left(\frac{maxValue}{U - latestPoint} * \frac{latestPoint - L}{U - L}\right),$$

as discussed above. Thus, the anomaly score may be $$\frac{92199}{92014-92010} + \left(\frac{92199}{92011-92010} * \frac{92014-92011}{92014-92010}\right) +$$
$$\left(\frac{92199}{92014-92011} * \frac{92011-92010}{92014-92010}\right) =$$
$$23049.75 + 69149.25 + 7683.25 = 99882.25.$$

Because a large number of lines are projected to be drawn before the value of the incoming request is isolated, were a traditional isolation forest technique being used, the system can determine that the request is likely non-anomalous activity and can allow the request to be processed.

Suppose, now, that an incoming request has a point of origin of ZIP code 77008, in Harris County, Tex. Because this request has a value that is the lowest value in the data set, the anomaly score may be calculated according to the equation:

$$anomalyScore = \frac{l}{l - latestPoint}.$$

Thus, the anomaly score may be $$\frac{91901}{91901 - 77008} = 6.17,$$

indicating that a traditional isolation forest technique may perform about six partitions of the data set before the incoming request is isolated. Because a very small number of lines are projected to be drawn before the value of the incoming request is isolated, the system can determine that the request is potentially anomalous activity and can take one or more actions to block execution of the request or request further verification before allowing or blocking execution of the request.

Figure 5:
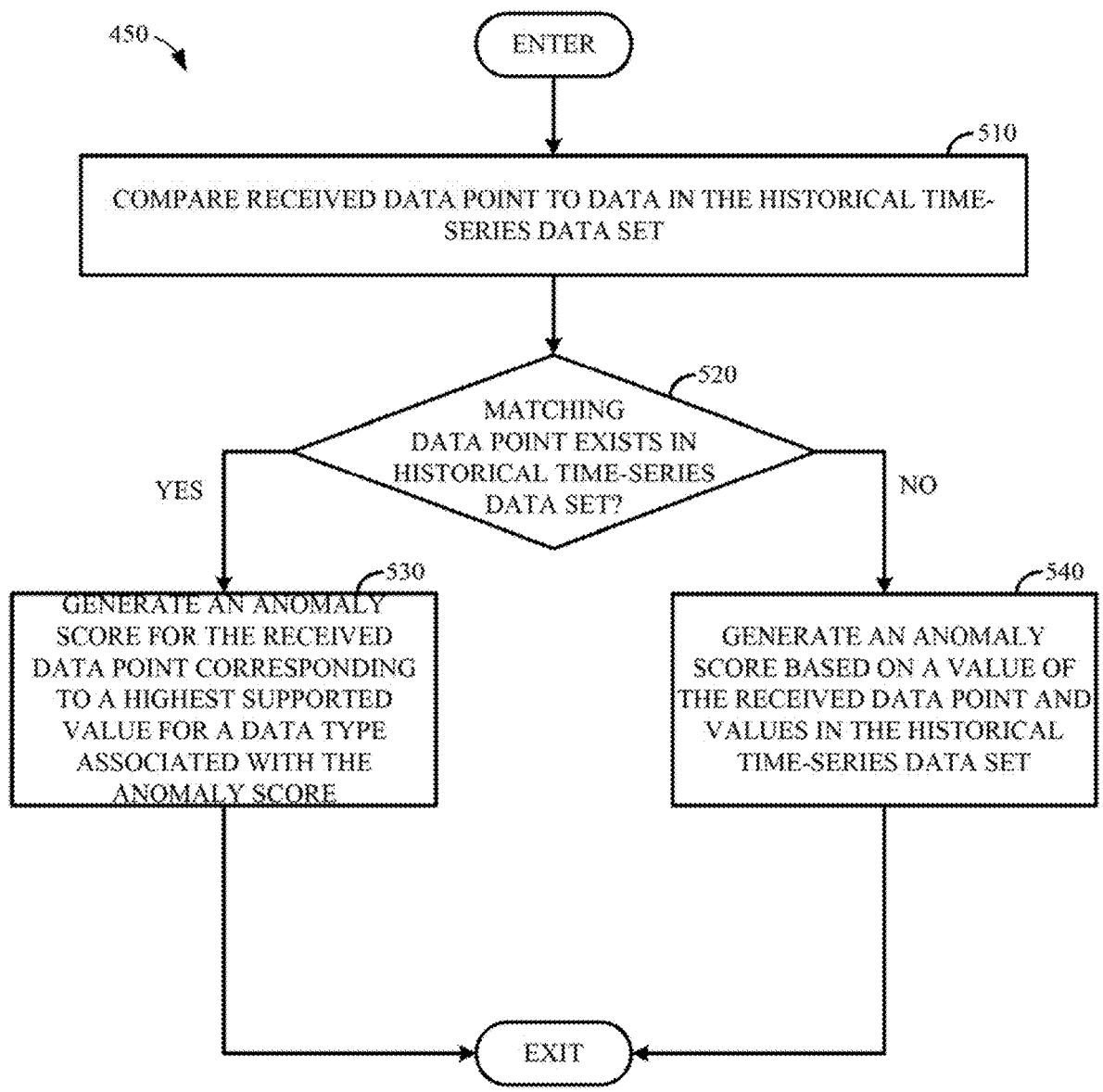
FIG. 5 illustrates example operations for generating an anomaly score for a data point that has previously been recorded in the computing system.

FIG. 5 illustrates further details of block 450 (of FIG. 4) for generating an anomaly score for a data point that has previously been recorded in the computing system, according to one embodiment. As illustrated, operations 450 starts at block 510, where the system compares the received data point to data points in the historical time-series data set. Generally, the system can compare the value of the received data point to values of each data point in the historical time-series data set to determine whether the received data point represents activity that has previously been recorded in the computing system.

At block 520, the system determines whether a matching data point exists in the historical time-series data set.

Generally, a matching data point exists in the historical time-series data set if the difference between the value of the received data point and the value of at least one data point in the historical time-series data set is zero.

If, at block 520, the system determines that a matching data point exists, then at block 530, the system generates an anomaly score for the received request corresponding to a highest supported value for a data type associated with the anomaly score. The anomaly score may be, for example, the value corresponding to a bitstream of all 1s for a given data type (e.g., 65535 for an unsigned 16-bit integer, 255 for an unsigned 8-bit integer, etc.), a reserved value, an infinite value defined in a programming language (e.g., math.inf in Python), or the like.

Figure 6:
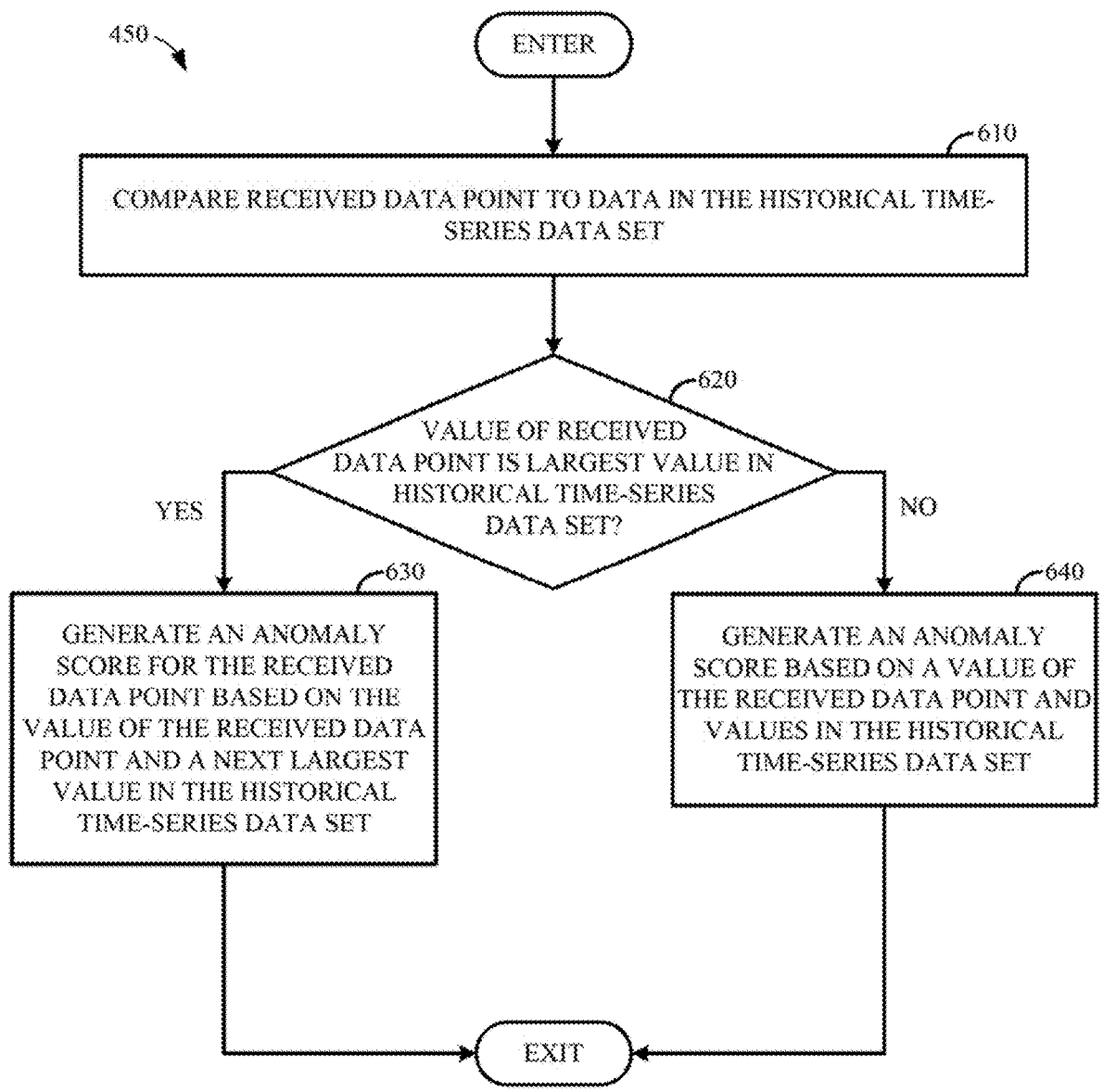
FIG. 6 illustrates example operations for generating an anomaly score for a data point having a value exceeding values previously recorded in the computing system.
Figure 7:
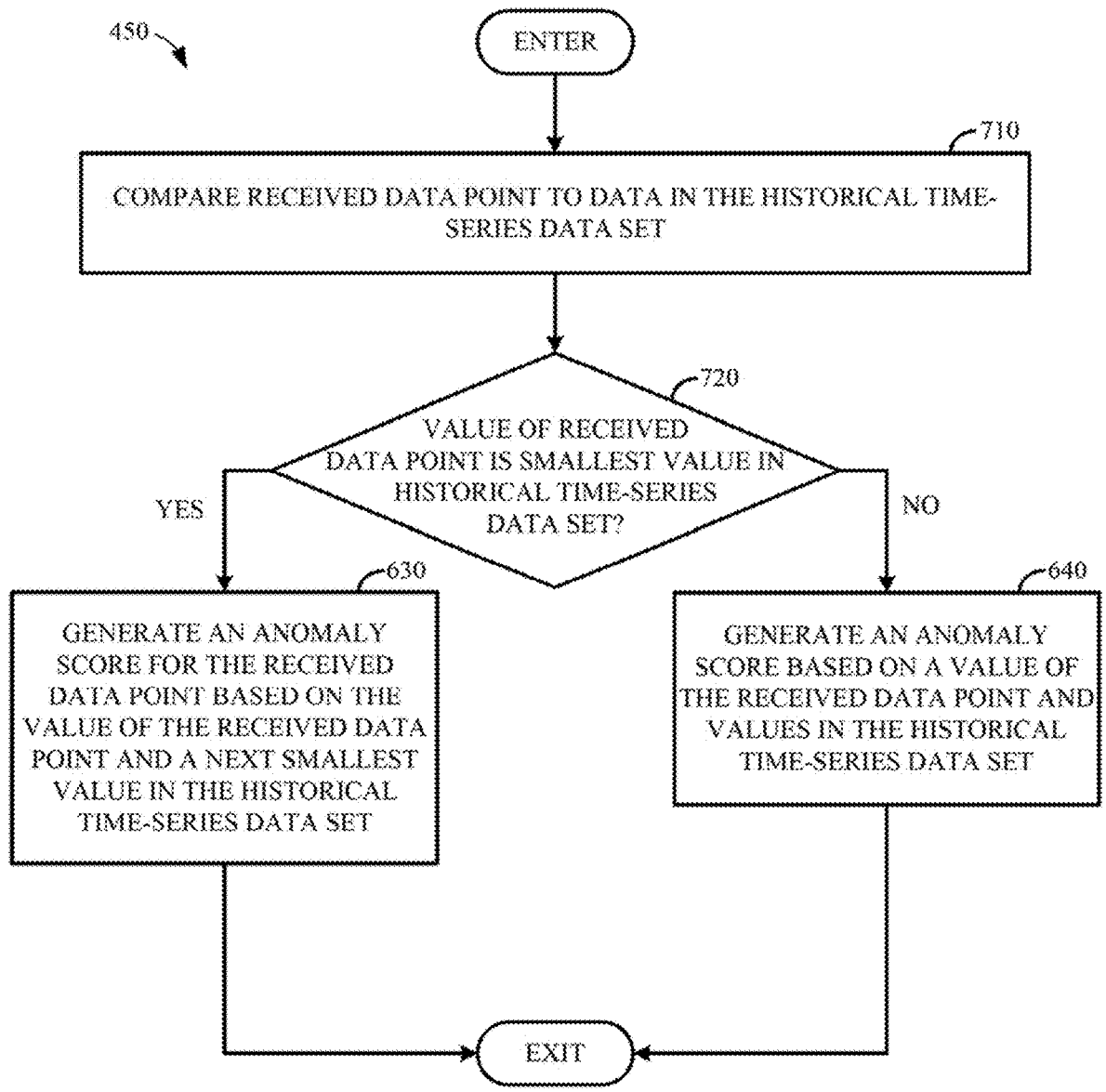
FIG. 7 illustrates example operations for generating an anomaly score for a data point having a value less than values previously recorded in the computing system.
Figure 8:
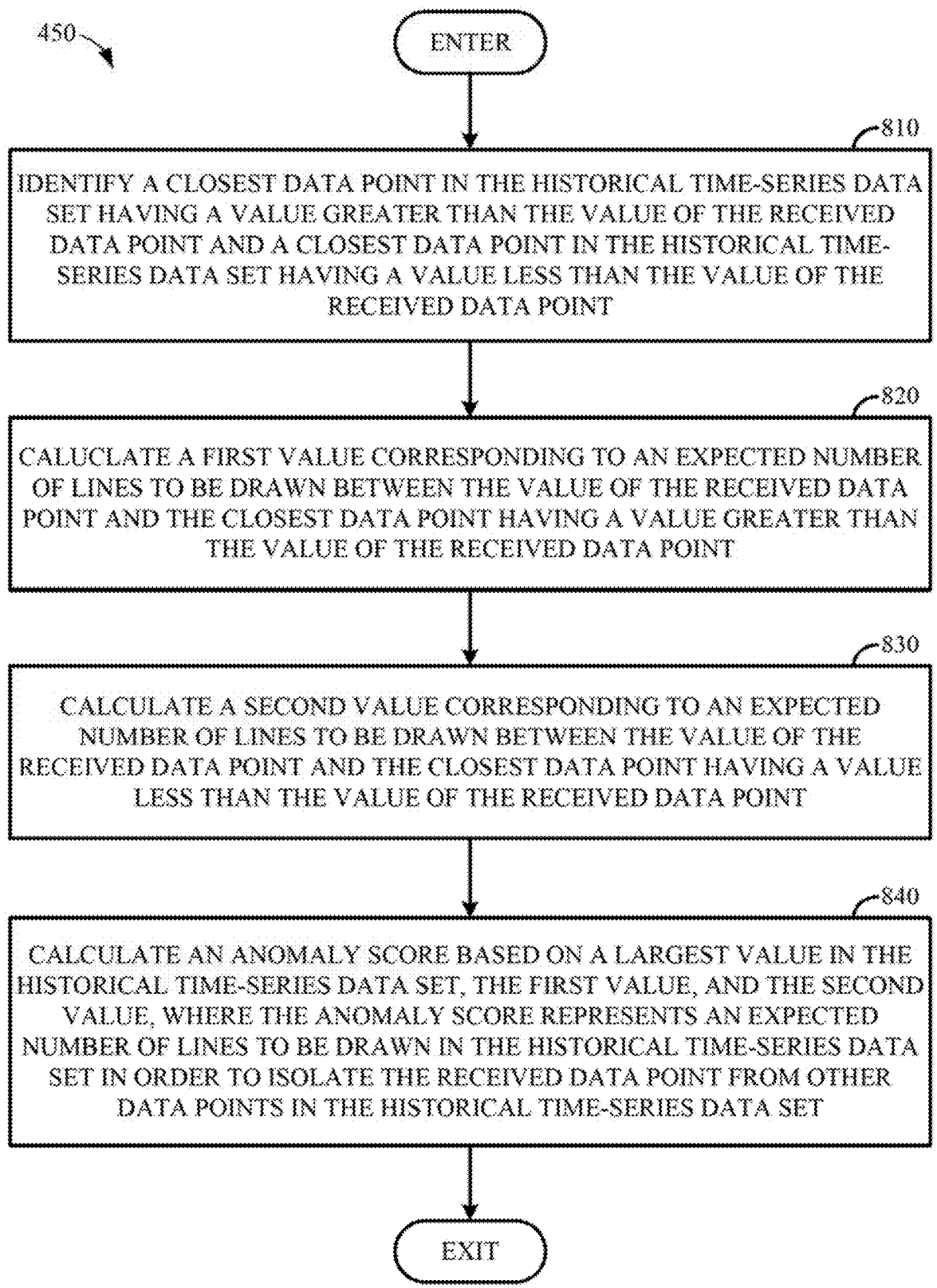
FIG. 8 illustrates example operations for generating an anomaly score for a data point having a value within a set of values previously recorded in the computing system.

Otherwise, if at block 520, the system determines that no matching data point exists in the historical time-series data set, then the system proceeds to generate an anomaly score based on a value of the received data point and values in the historical time-series data set, as illustrated in FIGS. 6-8.

FIG. 6 illustrates further details of block 450 (of FIG. 4) for generating an anomaly score for a data point with a value that exceeds previously recorded values in the historical time-series data set.

As illustrated, operations 450 start at block 610, where the system compares the received data point to data points in the historical time-series data set. Generally, the system can determine whether a difference greater than zero exists between the value of the received data point and each data point in the historical time-series data set. In some embodiments, the system can sort the values of the historical time-series data set while comparing the received data point to data points in the historical time-series data set.

At block 620, the system determines whether the value of the received data point is the largest value in the historical time-series data set. The system can determine this based on determining that a difference greater than zero exists between the value of the received data point and the value of each data point in the historical time-series data set or based on the position of the value of the received data point in a sorted list of values from the historical time-series data set.

If, at block 620, the system determines that the value of the received data point is the largest value in the historical time-series data set, then, at block 630, the system generates an anomaly score for the received request based on the value of the received data point and a next largest value in the historical time-series data set. As discussed, the anomaly score may thus be calculated according to the equation:

$$anomalyScore = \frac{latestPoint}{latestPoint - u}$$

where latestPoint represents the value of the received data point, and u represents the value of the data point in the data set with the next largest value.

Otherwise, if at block 620, the system determines that the value of the received data point is not the largest value in the historical time-series data set, then the system proceeds to generate an anomaly score based on a value of the received data point and values in the historical time-series data set, as illustrated in FIGS. 7-8.

FIG. 7 illustrates further details of block 450 for generating an anomaly score for a data point with a value that is less than previously recorded values in the historical time-series data set.

As illustrated, operations 450 start at block 710, where the system compares the received data point to data points in the historical time-series data set. Generally, the system can determine whether a difference less than zero exists between the value of the received data point and each data point in the historical time-series data set. In some embodiments, the system can sort the values of the historical time-series data set while comparing the received data point to data points in the historical time-series data set.

At block 720, the system determines whether the value of the received data point is the largest value in the historical time-series data set. The system can determine this based on determining that a difference less than zero exists between the value of the received data point and the value of each data point in the historical time-series data set or based on the position of the value of the received data point in a sorted list of values from the historical time-series data set.

If, at block 720, the system determines that the value of the received data point is the smallest value in the historical time-series data set, then, at block 630, the system generates an anomaly score for the received request based on the value of the received data point and a next smallest value in the historical time-series data set. As discussed, the anomaly score may thus be calculated according to the equation:

$$anomalyScore = \frac{l}{l - latestPoint}$$

where latestPoint represents the value of the received data point, and l represents the value of the data point in the data set with the next largest value.

Otherwise, if at block 720, the system determines that the value of the received data point is not the smallest value in the historical time-series data set, then the system proceeds to generate an anomaly score based on a value of the received data point and values in the historical time-series data set, as illustrated in FIG. 8.

FIG. 8 illustrates further details of block 450 for generating an anomaly score for a data point that has not previously been recorded in the historical time-series data set and is neither the largest nor the smallest value in the historical time-series data set.

As illustrated, operations 450 start at block 810, where the system identifies a closest data point in the historical time-series data set having a value greater than the value of the received data point and a closest data point in the historical time-series data set having a value less than the value of the received data point. The value of the closest data point having a value greater than the value of the received data point may be designated as U, the value of the closest data point having a value less than the value of the received data point may be designated as L, and the value of the received data point may be designated as latestPoint.

At block 820, the system calculates a first value corresponding to an expected number of lines to be drawn between the value of the received data point and the closest data point having a value greater than the value of the received data point.

In some embodiments, the first value may be weighted based on a probability that a line already exists between latestPoint and L before a line is drawn between latestPoint and U. The first value may be represented by the equation:

$$\frac{maxValue}{U - latestPoint} * \frac{latestPoint - L}{U - L},$$

where maxValue represents the largest value in the historical time-series data set.

At block 830, the system calculates a second value corresponding to an expected number of lines to be drawn between the value of the received data point and the closest data point having a value less than the value of the received data point.

In some embodiments, the second value may be weighted based on a probability that a line already exists between latestPoint and U before a line is drawn between latestPoint and L. The second value may be represented by the equation:

$$\frac{maxValue}{U - latestPoint} * \frac{latestPoint - L}{U - L}.$$

At block 840, the system calculates an anomaly score based on the largest value in the historical time-series data set, the first value, and the second value. Generally, the anomaly score may represent an expected number of lines to be drawn in the historical time-series data set in order to isolate the received data point from other data points in the historical time-series data set. In some embodiments, the anomaly score may be calculated according to the equation:

$$anomalyScore = \frac{maxValue}{U - L} + \left(\frac{maxValue}{latestPoint - L} * \frac{U - latestPoint}{U - L}\right) + \left(\frac{maxValue}{U - latestPoint} * \frac{latestPoint - L}{U - L}\right),$$

as discussed above.

Figure 9:
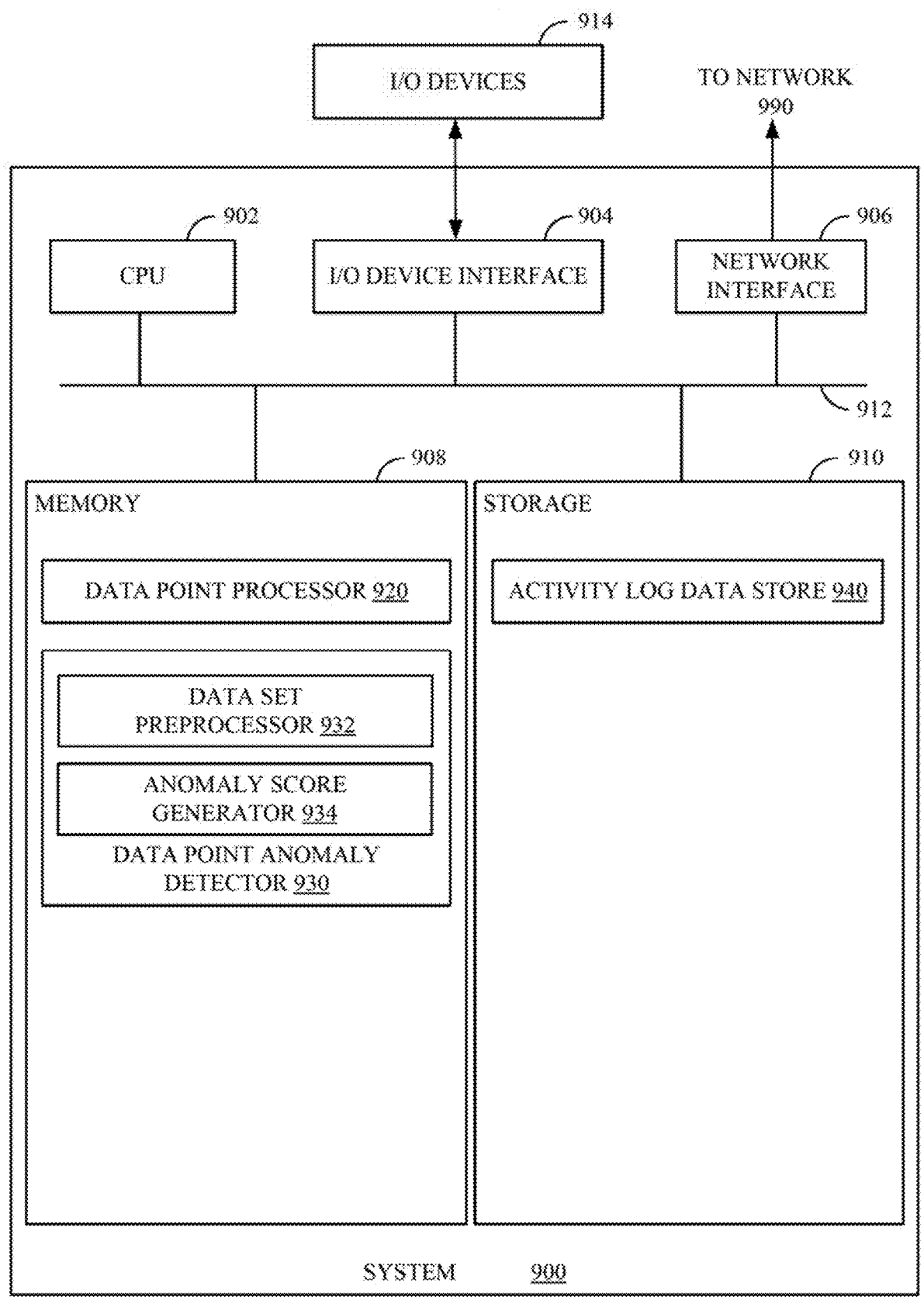
FIGS. 9 and 10 illustrate example computing systems on which embodiments of the present disclosure may be implemented.

Example Systems for Detection of Anomalous Access Requests in an Access-Controlled Computing System Based on a Closed-Form Isolation Forest Analysis FIG. 9 illustrates an example system 900 that can detect anomalous access requests in an access-controlled computing system based on a closed-form isolation forest analysis. For example, system 900 may comprise one or both of request gateway 110 and/or one or more computing resources 130 illustrated in FIG. 1.

As shown, system 900 includes a central processing unit (CPU) 902, one or more I/O device interfaces 904 that may allow for the connection of various I/O devices 914 (e.g., keyboards, displays, mouse devices, pen input, etc.) to the system 900, network interface 906 through which system 900 is connected to network 990 (which may be a local network, an intranet, the internet, or any other group of computing devices communicatively connected to each other), a memory 908, storage 910, and an interconnect 912.

CPU 902 may retrieve and execute programming instructions stored in the memory 908. Similarly, the CPU 902 may retrieve and store application data residing in the memory 908. The interconnect 912 transmits programming instructions and application data, among the CPU 902, I/O device interface 904, network interface 904, memory 908, and storage 910.

CPU 902 is included to be representative of a single CPU, multiple CPUs, a single CPU having multiple processing cores, and the like.

Memory 908 is representative of a volatile memory, such as a random access memory, or a nonvolatile memory, such as nonvolatile random access memory, phase change random access memory, or the like. As shown, memory 908 includes a request processor 920 and a request anomaly detector 930.

Request processor 920 generally receives requests to perform one or more actions within a computing system (e.g., invoke or otherwise execute a function exposed by one of a plurality of computing resources within a computing system) and, based on the anomaly score generated by request anomaly detector 930, identify one or more actions to take in respect of the received request. Generally, where an anomaly score indicates that the received request is likely to correspond to non-anomalous activity, request processor 920 can permit execution of the function(s) or operation(s) identified in the received request. Otherwise, request processor 920 can block execution of the function(s) or operation(s) identified in the received request, temporarily block execution until receiving confirmation from a user associated with the received request, or take other actions (as appropriate) to prevent potentially malicious or illegitimate activity from being performed within the computing system.

Request anomaly detector 930 generally receives an incoming request from request processor 920 and generates an anomaly score for the received request that the request processor 920 can use to determine whether to allow or block execution of the function(s) or operation(s) identified in the received request. As illustrated, request anomaly detector 930 includes a data set preprocessor 932 and an anomaly score generator 934. Data set preprocessor 932 generally generates a data set from data stored in activity log data store 940 that anomaly score generator 934 can use to determine whether a received request corresponds to non-anomalous or potentially anomalous activity within the computing system. The generated data set may be data from a window of time prior to a timestamp associated with the received request that excludes previously detected outliers so that the received request is compared to data corresponding to non-anomalous (e.g., typical) activity within the computing system.

Anomaly score generator 934 generally uses a statistical closed-form isolation forest analysis to generate an anomaly score for a received request corresponding to an expected number of lines that would be drawn by an isolation forest algorithm to isolate the value of the received request from other data in the generated data set. Generally, anomaly score generator may be configured to output a special value if the received request is a duplicate of a previously handled request. Otherwise, the anomaly score may be generated based on whether the value of the received request is the largest value in the generated data set, the smallest value in the generated data set, or neither the largest nor smallest value in the generated data set.

Storage 910 is representative of a non-volatile memory, such as a disk drive, solid state drive, or a collection of storage devices distributed across multiple storage systems. Although shown as a single unit, the storage 910 may be a combination of fixed and/or removable storage devices, such as fixed disc drives, removable memory cards or optical storage, network attached storage (NAS), or a storage area-network (SAN). Storage 910, as illustrated, may include an activity log data store 940 in which historical request activity and previously detected outliers in the historical request activity are stored.

Figure 10:
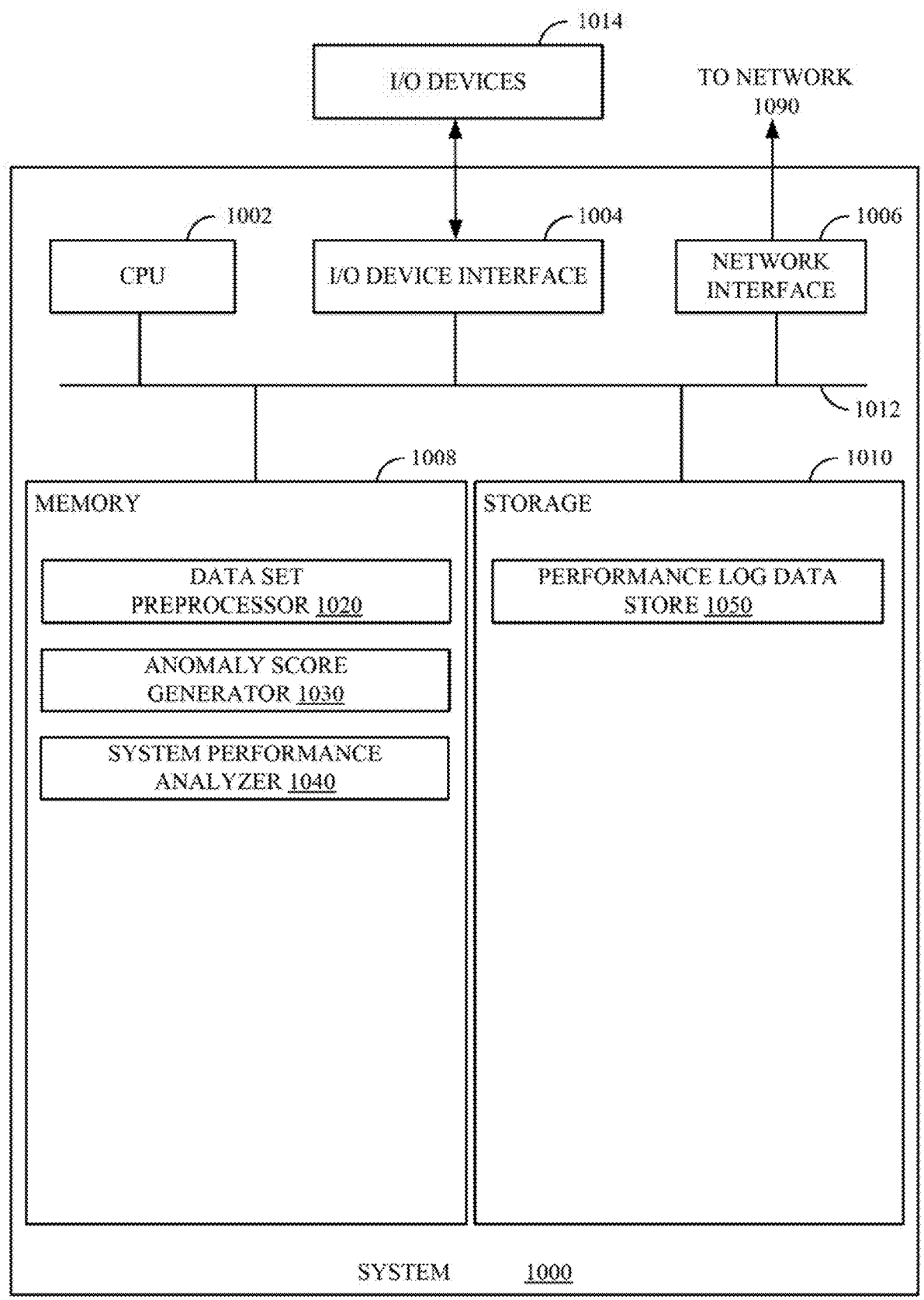

Example Systems for Detection of Anomalous Access Requests in an Access-Controlled Computing System Based on a Closed-Form Isolation Forest Analysis FIG. 10 illustrates an example system 1000 that can detect anomalous system performance in a computing system based on a closed-form isolation forest analysis. For example, system 1000 may comprise one or both of performance monitor 210 and/or one or more computing resources 230 illustrated in FIG. 2.

As shown, system 1000 includes a central processing unit (CPU) 1002, one or more I/O device interfaces 1004 that may allow for the connection of various I/O devices 1014 (e.g., keyboards, displays, mouse devices, pen input, etc.) to the system 1000, network interface 1006 through which system 1000 is connected to network 1090 (which may be a local network, an intranet, the internet, or any other group of computing devices communicatively connected to each other), a memory 1008, storage 1010, and an interconnect 1012.

CPU 1002 may retrieve and execute programming instructions stored in the memory 1008. Similarly, the CPU 1002 may retrieve and store application data residing in the memory 1008. The interconnect 1012 transmits programming instructions and application data, among the CPU 1002, I/O device interface 1004, network interface 1004, memory 1008, and storage 1010.

CPU 1002 is included to be representative of a single CPU, multiple CPUs, a single CPU having multiple processing cores, and the like.

Memory 1008 is representative of a volatile memory, such as a random access memory, or a nonvolatile memory, such as nonvolatile random access memory, phase change random access memory, or the like. As shown, memory 1008 includes a data set preprocessor 1020, anomaly score generator 1030, and a system performance analyzer 1040.

Data set preprocessor 1020 generally generates a data set from data stored in performance log data store 1050 that anomaly score generator 1030 can use to determine whether performance metrics from a service or computing resource in the computing environment correspond to non-anomalous or potentially anomalous performance within the computing system. The generated data set may be data from a window of time prior to a timestamp associated with a performance metric that excludes previously detected outliers so that the received request is compared to data corresponding to non-anomalous (e.g., typical) system performance within the computing environment.

Anomaly score generator 1030 generally uses a statistical closed-form isolation forest analysis to generate an anomaly score for a service performance metric corresponding to an expected number of lines that would be drawn by an isolation forest algorithm to isolate the value of the service performance metric from other data in the generated data set. Generally, anomaly score generator may be configured to output a special value if the service performance metric is a duplicate of a previously handled request. Otherwise, the anomaly score may be generated based on whether the value of the system performance metric is the largest value in the generated data set, the smallest value in the generated data set, or neither the largest nor smallest value in the generated data set.

System performance analyzer 1040 generally uses the anomaly scores generated by anomaly score generator 1030 to determine whether a service or computing resource in a computing environment is exhibiting performance issues and take one or more actions to remediate performance issues in the computing environment.

If the anomaly score indicates that a service or computing resource is exhibiting anomalous behavior, then system performance analyzer 1040 can, for example, roll a service back to a previous version of the service that was known to operate as expected, migrate services to different physical and/or virtual compute instances, or take other actions to remediate performance issues in the computing environment Storage 1010 is representative of a non-volatile memory, such as a disk drive, solid state drive, or a collection of storage devices distributed across multiple storage systems. Although shown as a single unit, the storage 1010 may be a combination of fixed and/or removable storage devices, such as fixed disc drives, removable memory cards or optical storage, network attached storage (NAS), or a storage area-network (SAN). Storage 1010, as illustrated, may include a performance log data store 1050 in which historical request activity and previously detected outliers in the historical request activity are stored.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the embodiments set forth herein. In addition, the scope of the disclosure is intended to cover such an apparatus or method that is practiced using other structure, functionality, or structure and functionality in addition to, or other than, the various embodiments of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting anomalous activity in a computing system, comprising:
   receiving a request to perform an action in a computing system;
   adding the request to a historical time-series data set;
   selecting a portion of the historical time-series data set to be used to determine whether the received request is an anomalous request;
   removing a set of previously identified outliers from the selected portion of the historical time-series data set;
   calculating an anomaly score for the received request based on a statistical analysis of the received request and the selected portion of the historical time-series data set, wherein the anomaly score comprises a predicted number of operations executed to isolate the received request from the selected portion of the historical time-series data set; and
   taking one or more actions to process the received request based on the calculated anomaly score.

2. The method of claim 1, wherein calculating the anomaly score for the received request comprises:
   determining that a matching data point exists in the selected portion of the historical time-series data set for the received request; and
   based on determining that the matching data point exists, outputting one of a reserved value or a highest supported value for a data type associated with the anomaly score as the calculated anomaly score.

3. The method of claim 1, wherein calculating the anomaly score for the received request comprises:
   determining that the received request corresponds to a largest value in the selected portion of the historical time-series data set; and
   based on determining that the received request corresponds to a largest value in the selected portion of the historical time-series data set, calculating the anomaly score as a geometric distribution based on a value of the received request and a difference between the value of the received request and a next largest value in the selected portion of the historical time-series data set.

4. The method of claim 1, wherein calculating the anomaly score for the received request comprises:
   determining that the received request corresponds to a smallest value in the selected portion of the historical time-series data set; and
   based on determining that the received request corresponds to a smallest value in the selected portion of the historical time-series data set, calculating the anomaly score as a geometric distribution based on a value of the received request and a difference between the value of the received request and a next smallest value in the selected portion of the historical time-series data set.

5. The method of claim 1, wherein the calculated anomaly score represents a number of lines expected to be drawn by an isolation forest algorithm to isolate a value of the received request within the selected portion of the historical time-series data set.

6. The method of claim 5, wherein calculating the anomaly score comprises:
   calculating a first value corresponding to an expected number of lines to be drawn between the value of the received request and a first data point in the selected portion of the historical time-series data set corresponding to a closest data point in the historical time-series data set having a value greater than the value of the received request; and
   calculating a second value corresponding to an expected number of lines to be drawn between the value of the received request and a second data point in the selected portion of the historical time-series data set corresponding to a closest data point in the historical time-series data set having a value less than the value of the received request, wherein the predicted number of operations executed to isolate the received request from the selected portion of the historical time-series data set comprises a value calculated using a geometric distribution based on the first value and the second value.

7. The method of claim 6, wherein calculating the anomaly score comprises calculating a score based on a largest value in the selected portion of the historical time-series data set, the first value, and the second value.

8. The method of claim 7, wherein the anomaly score is calculated as a sum of:
   an expected number of lines drawn in the selected portion of the data set before a line is drawn between the first data point and the second data point;
   a product of the second value and a probability that a line has already been drawn above a data point representing the received request and the first data point; and
   a product of the first value and a probability that a line has already been drawn below a data point representing the received request and the second data point.

9. The method of claim 1, wherein the taking one or more actions to process the received request comprises:
   determining, based on a comparison of the anomaly score and a threshold score, that the received request corresponds to an anomalous request; and adding the received request to the set of previously identified outliers.

10. The method of claim 1, wherein:
the received request comprises a request to access a service in a computing environment, and
the method further comprises: featurizing one or more parameters in the received request to access the service corresponding to information about a point of origin of the received request into one or more numerical values.

11. A system, comprising:
a processor; and
a memory having instructions stored thereon which, when executed by the processor, performs an operation for detecting anomalous activity in a computing system, the operation comprising:
receiving a request to perform an action in a computing system;
adding the request to a historical time-series data set;
selecting a portion of the historical time-series data set to be used to determine whether the received request is an anomalous request;
removing a set of previously identified outliers from the selected portion of the historical time-series data set;
calculating an anomaly score for the received request based on a statistical analysis of the received request and the selected portion of the historical time-series data set, wherein the anomaly score comprises a predicted number of operations executed to isolate the received request from the selected portion of the historical time-series data set; and
taking one or more actions to process the received request based on the calculated anomaly score.

12. The system of claim 11, wherein calculating the anomaly score for the received request comprises:
determining that a matching data point exists in the selected portion of the historical time-series data set for the received request; and
based on determining that the matching data point exists, outputting one of a reserved value or a highest supported value for a data type associated with the anomaly score as the calculated anomaly score.

13. The system of claim 11, wherein calculating the anomaly score for the received request comprises:
determining that the received request corresponds to a largest value in the selected portion of the historical time-series data set; and
based on determining that the received request corresponds to a largest value in the selected portion of the historical time-series data set, calculating the anomaly score as a geometric distribution based on a value of the received request and a difference between the value of the received request and a next largest value in the selected portion of the historical time-series data set.

14. The system of claim 11, wherein calculating the anomaly score for the received request comprises:
determining that the received request corresponds to a smallest value in the selected portion of the historical time-series data set; and
based on determining that the received request corresponds to a smallest value in the selected portion of the historical time-series data set, calculating the anomaly score as a geometric distribution based on a value of the received request and a difference between the value of the received request and a next smallest value in the selected portion of the historical time-series data set.

15. The system of claim 11, wherein:
the calculated anomaly score represents a number of lines expected to be drawn by an isolation forest algorithm to isolate a value of the received request within the selected portion of the historical time-series data set; and
calculating the anomaly score comprises:
calculating a first value corresponding to an expected number of lines to be drawn between the value of the received request and a first data point in the selected portion of the historical time-series data set corresponding to a closest data point in the historical time-series data set having a value greater than the value of the received request; and
calculating a second value corresponding to an expected number of lines to be drawn between the value of the received request and a second data point in the selected portion of the historical time-series data set corresponding to a closest data point in the historical time-series data set having a value less than the value of the received request, wherein the predicted number of operations executed to isolate the received request from the selected portion of the historical time-series data set comprises a value calculated using a geometric distribution based on the first value and the second value.

16. The system of claim 15, wherein calculating the anomaly score comprises calculating a score based on a largest value in the selected portion of the historical time-series data set, the first value, and the second value.

17. The system of claim 16, wherein the anomaly score is calculated as a sum of:
an expected number of lines drawn in the selected portion of the data set before a line is drawn between the first data point and the second data point;
a product of the second value and a probability that a line has already been drawn above a data point representing the received request and the first data point; and
a product of the first value and a probability that a line has already been drawn below a data point representing the received request and the second data point.

18. The system of claim 11, wherein the taking one or more actions to process the received request comprises:
determining, based on a comparison of the anomaly score and a threshold score, that the received request corresponds to an anomalous request; and
adding the received request to the set of previously identified outliers.

19. The system of claim 11, wherein:
the received request comprises a request to access a service in a computing environment, and
the operation further comprises featurizing one or more parameters in the received request to access the service corresponding to information about a point of origin of the received request into one or more numerical values.

20. A system, comprising:
a plurality of computing resources; and
a request gateway configured to:
receive a request to perform an action on one or more of the plurality of computing resources;
add the request to a historical time-series data set;
select a portion of the historical time-series data set to be used to determine whether the received request is an anomalous request;
remove a set of previously identified outliers from the selected portion of the historical time-series data set;

calculate an anomaly score for the received request based on a statistical analysis of the received request and the selected portion of the historical time-series data set, wherein the anomaly score comprises a predicted number of operations executed to isolate the received request from the selected portion of the historical time-series data set; and take one or more actions to process the received request based on the calculated anomaly score.

* * * * *